April 23, 1929.  H. E. BULMAHN  1,709,837
PIPE JOINT
Filed Feb. 23, 1926  2 Sheets-Sheet 1
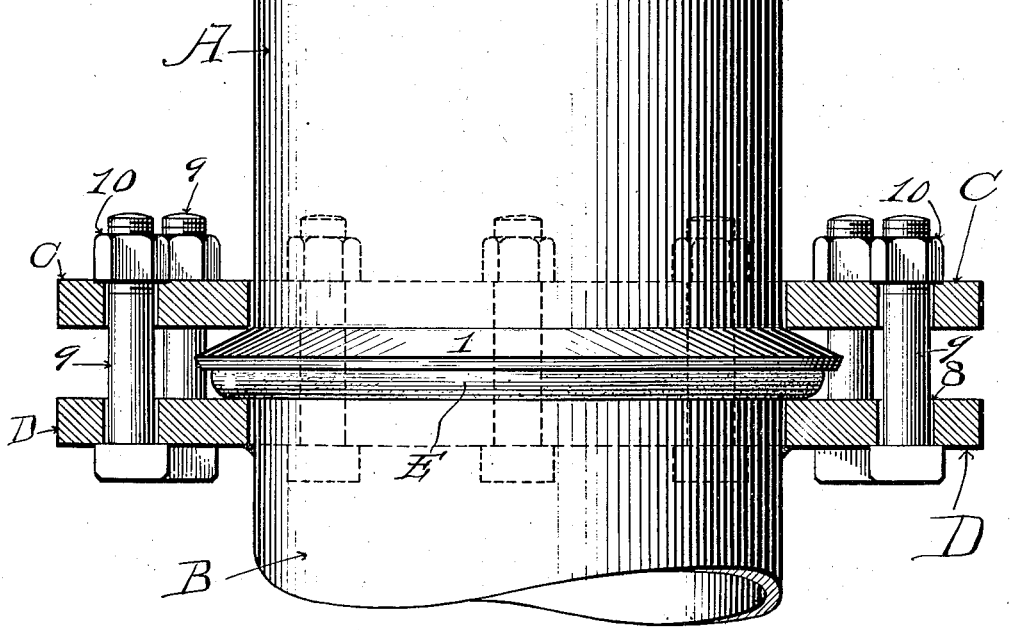
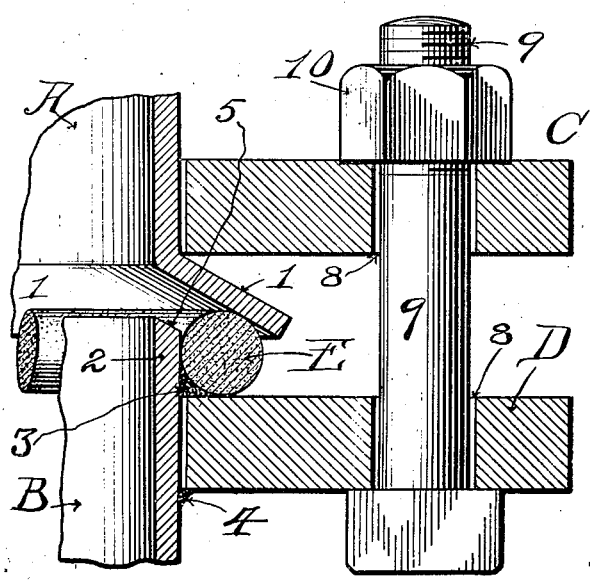

April 23, 1929.   H. E. BULMAHN   1,709,837
PIPE JOINT
Filed Feb. 23, 1926   2 Sheets-Sheet 2
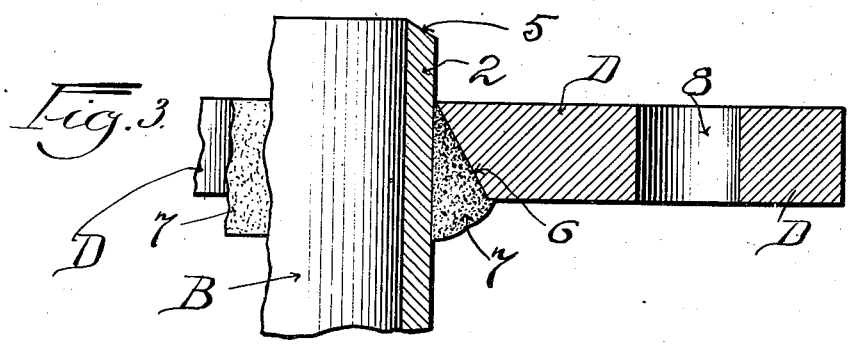
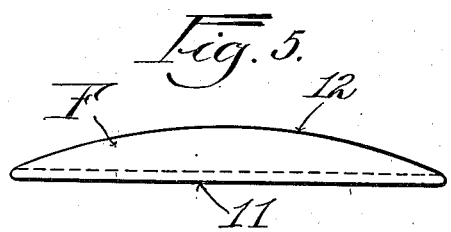
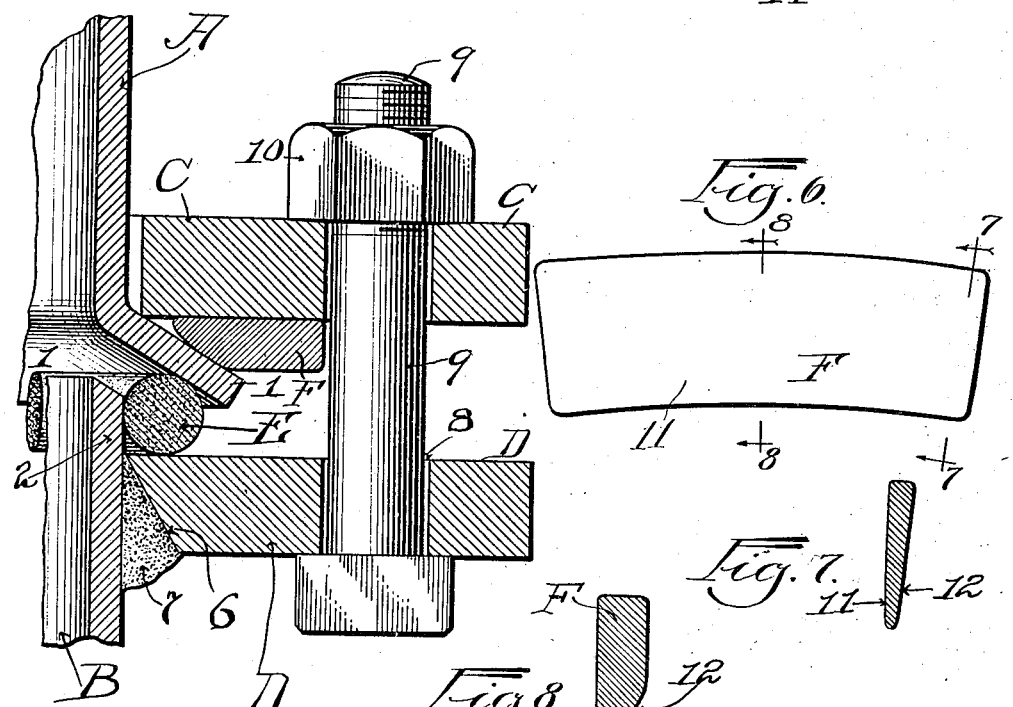
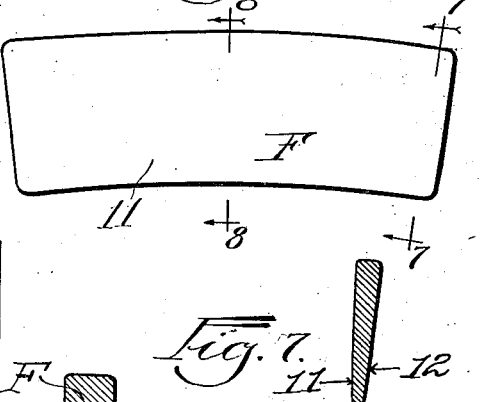
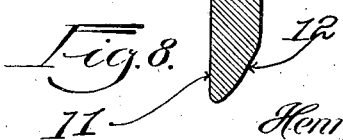
Inventor:
Henry Ernest Bulmahn,
By Brown & MacGregor Patented Apr. 23, 1929.

1,709,837

UNITED STATES PATENT OFFICE.

HENRY ERNEST BULMAHN, OF FORT WAYNE, INDIANA, ASSIGNOR TO THE WESTERN GAS CONSTRUCTION COMPANY, OF FORT WAYNE, INDIANA, A CORPORATION OF INDIANA.

PIPE JOINT.

Application filed February 23, 1926. Serial No. 89,836.

This invention relates to pipe joints, and more particularly to joints for light pipes used for conveying gases, hot air, blast furnace products, vapors, low pressure steam and other vaporous materials at low pressure.

It is common to make pipes, for the purposes just stated, from thin steel plate, generally of $\frac{3}{16}''$ or $\frac{1}{4}''$ thick, the pipes ranging from 12'' to 48'' and 60'' in diameter, and even larger, and the joints made by electric arc welding.

The pipe sections are aligned end to end, and connected together in a variety of ways to make gas-tight joints. One of the means generally employed for making the joints embodies ring flanges on the adjacent ends of the pipe sections, clamped together by a plurality of bolts, with packing or gaskets between the flanges, the face of the flanges extending at right angles to the longitudinal axis of the pipe. Sometimes the pipes are bent outwardly to form circumferential pipe flanges. In all such arrangements it is manifest that the pipe sections must be flanged to a full ninety (90°) degrees; that any gasket or packing between the flanges must be uniformly laid, and that the pipe flanges must be uniformly drawn together to make a gas-tight joint; and that this requires accuracy and the skill of expert workmen.

The object of the present invention is to provide a structure by which gas tight joints may be effected with absolute certainty, by an ordinary workman, not necessarily an expert; a structure which will have such "flexibility" that a perfectly tight joint will be effected between adjacent pipe sections, even if these two sections are not in perfect longitudinal alignment; and a structure which will permit of quick and easy repair in the event of a leak due to some accident.

To the attainment of these and other objects, the advantages of which will be more apparent as I proceed with this specification, my invention consists of the devices and combinations of devices illustrated and described and more particularly pointed out in the appended claims.

In the accompanying drawings, by which I illustrate my invention:

Figure 1 is an outside view of the joint, the clamping rings being in section.

Figure 2 is a longitudinal, sectional view, enlarged, of one side of the pipe walls, to more clearly bring out details.

Figure 3 is an enlarged, longitudinal sectional view through one wall of one of the pipe sections, to illustrate a modified form of securing a ring flange thereto.

Figure 4 is an enlarged, longitudinal view through the walls of two pipe sections, showing the joint gasket and a segmental clamping wedge.

Figures 5 and 6 are plan and side views, respectively, of the segmental clamping wedge.

Figures 7 and 8 are sectional views of the segmental gasket, taken, respectively, in the planes of the dotted lines 7—7 and 8—8 of Fig. 6.

In said drawings, the adjoining sections of pipe are indicated by the letters A and B, ring flanges by the letters C and D, a gasket by the letter E and a clamping wedge by the letter F.

The lower end of the pipe section A is bent or flared outwardly, as indicated, to form an angularly disposed, circumferential flange 1. The deflection is downward, as shown in Figures 1 and 2; that is, in the direction of the adjoining pipe section B. When the inner surface of the flange 1 inclines with respect to the longitudinal axis of the pipe section A at an angle of approximately sixty degrees, the most satisfactory results are obtained. I do not limit the invention, however, in this respect, except that the angle should not be a right angle, and must be an angle of less than ninety degrees.

The ring flanges C and D are placed over the pipe sections A and B, as shown, the ring flange C being loosely mounted upon the pipe section A and resting upon the back of the pipe flange 1. The pipe section B projects through the ring flange D a short distance, as indicated at 2. The flange D is firmly secured to the pipe section B by electric welding, as at 3 and 4, or by other suitable means. The top edge or end of the portion 2 of pipe section B is, preferably, tapered as indicated at 5, the angle or taper corresponding to the angle of the pipe flange 1.

The outside surface of the projecting part 2 of pipe section B and the face of the ring flange D form a pocket or circumferential seat for the gasket or packing E, which gasket may be of any suitable material, size and shape. Instead of the welding arrangement shown at 3 and 4, I may taper the inside wall or pipe opening of the ring D, as shown at 6 (Figure 3) and secure the ring D to pipe B by soldering or welding as indicated at 7.

Through each flange C and D are a plurality of bolt holes 8 adapted to receive the bolts 9. Nuts 10 enable me to draw the pipe sections A and B together to form a tight joint. It will be understood, of course, that in thus joining the sections A and B, the movable flange ring C bears upon the outside of the pipe flange 1, and the inside or face of the inclined pipe flange 1 bears upon the gasket E and thus completes the joint.

In Figures 4 to 8, inclusive, I have shown a segmental wedge F which is used to supplement the joint gasket E in cases of local leak in the joint due to some accidental cause and where a new gasket E or a mere tightening up of the bolts 9 and 10 would not close the leak; or where it is desirable to close the leak without dismantling the pipe line to remove a section or to replace the gasket by a fresh gasket.

This wedge F is inserted in the joint between the outside or top surface of the pipe flange 1 and the ring flange C, some of the bolts 9, 10, having been first loosened. The wedge F, it will be noticed, has a flat surface 11, to contact with the face of the ring flange C, and an angular or inclined surface 12, to contact with the pipe flange 1. The wedge F is of varying thickness throughout its length as indicated in the sectional views, Figs. 7 and 8, and is curved or segmental in its general outline, as clearly shown in Figures 5 and 6.

Thus, when inserted in position as indicated in Figure 4, to close a "local" leak, and the bolts again tightened, the pressure will cause the flange 1 to be distorted under the wedge F. The distorted or inwardly bent-in portion of the flange 1 will press upon the gasket E, close the leak and thereby restore a firm, tight joint.

In operation, the tightening of the various bolts and nuts, 9, 10, will cause an even pressure upon the gasket E, and as this tightening is continued, the gasket E is wedged by the flange 1 and a perfect air or gas tight joint effected. I have shown the end of the pipe section B tapered at 5 so that it will have a firm bearing against the pipe flange 1 when the pipe sections are drawn together so as to contact.

It will be understood that this form of joint is "flexible", in a sense, in that the joined pipe sections may be mis-aligned and still be properly joined against leakage. It will also be understood that by the use of the clamping wedge F, a leak due to accident or other cause may be readily cured "locally" without dismantling the whole or even several sections of a pipe line. And, it will be further understood that the device is simple, relatively cheap, and that it does not require the services of an expert in its original assembly or for repair purposes.

It will be noticed that the members C and D are simple annular elements or rings which, when in use, function as annular flanges, but which, per se, have no flanges or projecting parts. They are commercial shapes and hence contribute to the cheapness of the joint as a whole.

It will also be noted that the end of the female pipe A with its annular projecting circumferential flange 1 may be easily manufactured, is not corrugated or shaped in any special manner for the purpose of forming pockets, recesses or shoulders for the reception of gaskets or other packing material, and that the other end of the pipe A, namely: the male end of the joint, is not bent or otherwise configurated. The pipe as a whole has walls parallel with the central longitudinal axis of the pipe, excepting at one end where the annular flange is formed. This also contributes toward cheapness of initial construction and further contributes to the cheapness of the joint in the elimination of the necessity of employing expert or specially skilled workmen for uniting the pipe sections together.

It will also be noted that a tight joint may be formed by my device even when adjacent sections are not in strict longitudinal alignment.

I claim as my invention:

1. A pipe joint comprising two movable pipe sections, the end of one section being flared to form a circumferential flange extending angularly toward the other pipe section, a flat ring member loosely encircling said pipe section and having line contact with said circumferential flange, a second flat ring member fixed to the other pipe section spaced from the end of said pipe, a gasket located between the angular face of the circumferential flange and the relatively flat face of the fixed ring and surrounding the projecting end of the pipe section to which the fixed ring is attached, and means for drawing the two rings together to compress the gasket between said rings and inwardly toward the projecting end of the pipe surrounded by said gasket.

2. A pipe joint comprising two pipe sections, the end of one section being flared to form a circumferential flange extending angularly toward the other pipe section at less than a ninety degree angle to the longitudinal axis of the pipe back of the circumferential flange, a ring member loosely mounted on the said section back of the circumferential flange, the opposing surfaces extending angularly with respect to each other, a second ring member fixed to the other pipe section, the end of the latter projecting through and beyond the said fixed ring member, a gasket located between the proximate faces of the angular circumferential flange and the said fixed ring and surrounding the projecting pipe end, and means connecting the two rings and adapted to draw the pipe sections together longitudinally to compress the gasket inwardly toward the projecting pipe end.

3. A pipe joint comprising two pipe sections, the end of one section being bent to form a circumferential flange extending angularly toward the other pipe section, at less than a ninety degree angle to the longitudinal axis of the pipe section, a ring flange loosely mounted on said section back of the circumferential flange, a ring flange secured to the other pipe section, the end of the latter projecting through and beyond the fixed ring flange, a gasket on the fixed ring flange surrounding the projecting pipe end, and locking means for the ring flanges adapted to draw the pipe sections together longitudinally to form the joint, and a wedge member between the pipe flange and the movable ring flange.

4. A pipe joint comprising two sections, the end of one section being bent to form a circumferential flange extending toward the other section at an angle of less than ninety degrees to the longitudinal axis of the pipe section, a ring member loosely mounted upon said section back of the circumferential flange, a second ring member fixed to the other pipe section, the end of the latter projecting through and beyond said fixed ring member, a gasket on the fixed ring member surrounding the projecting pipe end, locking means for the ring members adapted to draw the pipe sections together longitudinally to form a joint, and a wedge member having a top surface to contact with the under surface of the movable ring member and having an under surface tapered complementally to the top surface of the pipe flange upon which it bears.

5. A pipe joint comprising two pipe sections, the end of one section being bent to form a circumferential flange extending angularly toward the other pipe section, at less than a ninety degree angle to the longitudinal axis of the pipe section, a ring flange loosely mounted on said section back of the circumferential flange, a ring flange secured to the other pipe section, the end of the latter projecting through and beyond the fixed ring flange, a gasket on the fixed ring flange surrounding the projecting pipe end, locking means for the ring flanges adapted to draw the pipe sections together longitudinally to form the joint, and a segmental wedge member between the pipe flange and the movable ring flange, said segmental wedge member being of varying sectional dimensions.

In testimony, that I claim the foregoing as my invention I affix my signature this 8th day of February, 1926.

HENRY ERNEST BULMAHN.